US006750173B2

(12) United States Patent
Rizkalla et al.

(10) Patent No.: US 6,750,173 B2
(45) Date of Patent: Jun. 15, 2004

(54) ETHYLENE OXIDE CATALYST

(75) Inventors: Nabil Rizkalla, Rivevale, NJ (US); Errrol Bornn, Hillside, NJ (US); Charles W. Zulauf, Lincoln Park, NJ (US)

(73) Assignee: Scientific Design Company, Inc., Little Ferry, NJ (US)

( * ) Notice: Subject to any disclaimer, the term of this patent is extended or adjusted under 35 U.S.C. 154(b) by 22 days.

(21) Appl. No.: 10/118,192

(22) Filed: Apr. 8, 2002

(65) Prior Publication Data

US 2003/0191019 A1 Oct. 9, 2003

(51) Int. Cl.[7] .................... B01J 23/50; C07D 301/10; C07D 301/03
(52) U.S. Cl. .................... 502/348; 502/347; 549/534; 549/536; 549/537
(58) Field of Search .................... 502/347, 348; 549/534, 536, 537

(56) References Cited

U.S. PATENT DOCUMENTS

| | | | |
|---|---|---|---|
| 2,709,173 A | * 5/1955 | Brengle et al. | 260/348.5 |
| 3,563,913 A | 2/1971 | de Krijger et al. | 252/463 |
| 3,563,914 A | 2/1971 | Wattimena | 252/463 |
| 3,962,136 A | 6/1976 | Nielsen et al. | 252/454 |
| 4,007,135 A | 2/1977 | Hayden et al. | 252/467 |
| 4,010,115 A | 3/1977 | Nielsen et al. | 252/454 |
| 4,012,425 A | 3/1977 | Nielsen et al. | 260/388.5 R |
| 4,212,772 A | 7/1980 | Mross et al. | 252/476 |
| 4,272,443 A | 6/1981 | Titzenthaler et al. | 260/348.34 |
| 4,278,562 A | 7/1981 | Mross et al. | 252/430 |
| 4,368,144 A | 1/1983 | Mitsuhata et al. | 252/463 |
| 4,414,135 A | 11/1983 | Nojiri et al. | 502/224 |
| 4,740,493 A | 4/1988 | Boehning et al. | 502/348 |
| 4,766,105 A | 8/1988 | Lauritzen | 502/216 |
| 4,908,343 A | 3/1990 | Bhasin | 502/218 |
| 5,011,807 A | 4/1991 | Hayden et al. | 502/218 |
| 5,057,481 A | 10/1991 | Bhasin | 502/208 |
| 5,102,848 A | 4/1992 | Soo et al. | 502/218 |
| 5,486,628 A | 1/1996 | Kemp | 549/536 |
| 5,705,661 A | 1/1998 | Iwakura et al. | 549/536 |
| 5,801,259 A | * 9/1998 | Kowaleski | 549/536 |
| 6,103,916 A | 8/2000 | Takada et al. | 549/534 |

FOREIGN PATENT DOCUMENTS

| | | |
|---|---|---|
| EP | 0247414 | 5/1987 |
| EP | 0266015 | 5/1988 |
| EP | 0716884 A2 | 6/1996 |
| WO | WO 00/15333 | 3/2000 |
| WO | WO 00/15334 | 3/2000 |
| WO | WO 00/15335 | 3/2000 |

* cited by examiner

Primary Examiner—Stanley S. Silverman
Assistant Examiner—Jonas N. Strickland
(74) Attorney, Agent, or Firm—William C. Long

(57) ABSTRACT

The invention relates to an ethylene oxide catalyst comprised of silver deposited on an alumina carrier which has been treated to remove at least 25% of the surface sodium ions and replace the removed sodium ions with up to 10 ppm of lithium ions and to the preparation thereof.

7 Claims, No Drawings

ETHYLENE OXIDE CATALYST

BACKGROUND OF THE INVENTION

1. Field of the Invention

The present invention relates to silver catalysts for the oxidation of ethylene to ethylene oxide, and especially to the preparation of catalyst supports or carriers having improved properties such that catalysts comprising the carriers have enhanced utility.

2. Description of the Prior Art

Processes for the production of ethylene oxide involve the vapor phase oxidation of ethylene with molecular oxygen using a solid catalyst comprised of silver on a support such as alumina. There have been efforts by many workers to improve the effectiveness and efficiency of the silver catalyst for producing ethylene oxide. U.S. Pat. No. 5,051,395 provides an analysis of these efforts of various prior workers.

U.S. Pat. Nos. 3,962,136, 4,010,115 and 4.012,425 describe the use of alkali metal promoters such as cesium to improve silver ethylene oxide catalysts.

Among the many prior teachings in this area is that of U.S. Pat. No. 4,007,135 (see also UK 1,491,447) which teaches variously silver catalysts for the production of ethylene and propylene oxides comprised of a promoting amount of copper, gold, magnesium, zinc, cadmium, mercury, strontium, calcium, niobium, tantalum, molybdenum, tungsten, chromium, vanadium, and/or preferably barium, in excess of any present in immobile form in the preformed support as impurities or cements (column 2, lines 1–15), silver catalysts for the production of propylene oxide comprising a promoting amount of at least one promoter selected from lithium, potassium, sodium, rubidium, cesium, copper, gold, magnesium, zinc, cadmium, strontium, calcium, niobium, tantalum, molybdenum, tungsten, chromium, vanadium and barium, in excess of any present in immobile form in the preformed support as impurities or cements (column 2, lines 16–34), as well as silver catalysts for producing ethylene oxide or propylene oxide comprising (a) a promoting amount of sodium, cesium, rubidium, and/or potassium, and (b) magnesium, strontium, calcium and/or preferably barium in a promoting amount (column 3, lines 5–8).

U.S. Pat. No. 5,057,481, and related U.S. Pat. No. 4,908,343 are concerned with silver ethylene oxide catalysts comprised of cesium and an oxyanion of a group 3b to 7b element.

U.S. Pat. No. 3,888,889 describes catalysts suitable for the oxidation of propylene to propylene oxide comprised of elemental silver modified by a compound of an element from Group 5b and 6b. Although the use of supports is mentioned, there are no examples. The use of cesium is not mentioned.

European Patent 0 266 015 and U.S. Pat. No. 4,766,105 deal with supported silver catalysts promoted with rhenium and a long list of possible copromoters.

U.S. Pat. No. 5,102,848 deals with catalysts suitable for the production of ethylene oxide comprising a silver impregnated support also having thereon at least one cation promoter such as cesium, and a promoter comprising (i) sulfate anion, (ii) fluoride anion, and (iii) oxyanion of an element of Group 3b to 6b inclusive of the Periodic Table.

U.S. Pat. No. 5,486,628 describes a silver catalyst promoted with alkali metal, rhenium and a rare earth or lanthanide component.

U.S. Pat. No. 5,011,807 is concerned with an ethylene oxide catalyst comprised of silver, alkali metal, a transition metal, and sulfur on alumina support.

The support of choice in the preparation of silver ethylene oxide catalysts has in the past been a solid inorganic material such as alumina, silica, or titania based compounds, or combinations thereof. Alpha alumina which may contain silica has been an especially preferred carrier.

Various patents have focused on the pretreatment of such carriers to improve the utility thereof. U.S. Pat. No. 5,102,848, for example, shows repeated alpha alumina support washing with 90° C. deionized water prior to deposition of the catalyst components. In the same patent, the carrier was also washed with HF solution at 25° C. In both cases there was no claim or demonstration of the effect of carrier washing on the catalyst's stability.

Later U.S. Pat. No. 6,103,916 similarly shows washing alpha alumina support with 90° C. water repeatedly prior to deposition of the catalytic components in ethylene oxide catalyst preparation.

The prior art has disclosed that the presence of either sodium or lithium will have a profound effect on the performance of the silver catalyst. The claims of different patents, however, are not in agreement regarding the effect of these two alkali metals.

The prior art has been inconsistent about the effect of sodium on the catalytic performance of the silver catalyst. For instance, several patents have disclosed the importance of the presence of a minimum amount of Na on the surface of the carrier:

1. U.S. Pat. No. 4,740,493 states that the carrier should have at least 50 ppm of soluble Na ion, see claims 1 and 5.
2. U.S. Pat. No. 4,414,135 states, in the first claim, the advantage of a catalyst containing at least 1000 ppm Na, in addition to Cs.
3. EP 0247 414 B2 discloses, in the first claim, the prerequisite of having a carrier containing at least 0.08% and up to 2% sodium. In addition, it is taught that the silver impregnating solution should also contain Na, along with K or Cs.

By contrast, the claims of the following patents have disclosed the importance of lowering the amount of surface sodium:

1. U.S. Pat. No. 4,368,144 states that better performance is obtained with carriers that contain no more than 0.07% Na.
2. WO 00/15333, 15334, 15335 disclose improvement of the properties of the carrier by lowering the concentration of ionizable species, especially Na and silica, using boiling de-ionized water. The patents disclose that it is preferred to lower the concentration of Na and silica by at least 5%.
   In the preferred Na removal method, the carrier is repeatedly immersed in boiling water.
3. U.S. Pat. No. 6,103,916, EP 0937 498A1 claim that catalyst performance is improved when the carrier is washed by boiling in pure water until the water resistivity is more than 10,000 $\Omega$.cm.

Lithium has repeatedly been mentioned as an example of the alkali metals that can be added to improve the selectivity of the catalyst. It has been mentioned along with Na, K, Rb and Cs, with Cs as the preferred promoter alkali metal. In few cases, however, Li was added to Cs as a co-promoter, e.g. U.S. Pat. Nos. 4,272,443, 4,278,562, 4,212,772 and EP 0384 312 B1. Also, EP 0624 398 B1 discloses the addition of Li to the silver impregnating solution, along with the other promoters: Cs, W and Na (example 2).

Several patents have indicated that Li and Na are similar in their effect on the catalyst's performance:

1. U.S. Pat. No. 4,916,243 discloses using combinations of a Cs salt and a salt of any of the other alkali metals.
2. U.S. Pat. No. 4,820,675 discloses using combinations of a Cs salt and a salt of any of the other alkali metals. Addition of Li to Cs was augmented with addition of Na, column 7, and experiment 7–28, column 25.
3. U.S. Pat. No. 4,212,772 indicates that Na and Li are equivalent with respect to their influence on the catalyst's life, and selectivity, and that their mixtures, in all proportions gave favorable influence, column 2 line 49.
4. WO 00/15333, 15334, 15335 disclose improving the carrier via removing "ionizable species" from its surface. These ionizable species include sodium, cesium and lithium.

Treating the carrier with Li before use is known and has been disclosed in the following cases:

1. U.S. Pat. No. 5,705,661 discloses that the carrier was pretreated by impregnation with Li and Cs provided that at least 100 ppm Li will be present in the finished catalyst. The pretreatment was based on soaking the carrier in a water solution containing both Li and Cs carbonates, followed by drying.
2. EP 0716 884 B1 discloses the preference for pre-depositing a pre-dopant of at least one alkali metal, Li, K, or Cs. The pre-doping procedure involves vacuum impregnating the carrier for three minutes and then drying the carrier at a temperature of up to 1000° C. The amount of predopant is in the range of 10 to 5000 ppm.
3. U.S. Pat. Nos. 3,563,913 and 3,563,914 describe pre-impregnation of alpha alumina with a lithium compound such as lithium hydroxide followed by drying before silver impregnation.
4. WO 00/15333 suggests washing and ion exchange, among several other methods, to lower the concentration of ionizable species, particularly silicates. Tetra-ethyl ammonium hydroxide, ammonium acetate, lithium carbonate and barium acetate are mentioned as examples of wash and ion exchange solutions. There are no examples that showing treatment with Li and the disclosure does not mention, or suggest the possibility of utilizing alternative lithium salts.

WO 00/15333, 15334, 15335 disclose that ionizable species to be removed from the carrier's surface, especially the silicates are soluble in the same solutions that Na is soluble in. Therefore, measurement of the solubilization rate of Na is a direct measurement of the solubilization of the other ions (WO 00/15335, P 4, line 1)

SUMMARY OF THE INVENTION

In spite of the myriad of sometimes inconsistent teachings in the prior art, it has been discovered that carriers which have the surface sodium removed and partially replaced with lithium, in a pre-treatment process, give catalysts with improved performance, especially higher stability. This is quite distinctive from the prior art which addressed the effect of Na and Li as two separate issues.

DETAILED DESCRIPTION

The concentration of Na on the surface of the carrier may be higher or lower than the underlying layers. The amount of this surface Na may be influenced by the bulk's composition and may also be a function of the composition of the binding material and the firing parameters of the carrier. Since the active silver particles are deposited only on the carrier's surface, the chemistry of that surface influences the function of the silver and has a profound effect on the catalyst's performance.

We have discovered that the ultimate catalyst performance for ethylene oxide production is greatly enhanced when the Na ions on the surface of the carrier are partially replaced with Li ions, in a pre-treatment step.

Replacing sodium with lithium yields a surface that has Li ions and is totally, or partially, depleted of its sodium. The general target of the treatment is to remove at least 25% of the surface sodium and at least partially replace it with lithium. It is preferred to remove at least 50% of the surface sodium and most preferred to remove at least 90% the sodium on the surface, and partially replace it with up to 10 ppm, suitably 1–10 ppm Li.

An additional feature of this invention is to control the amount of silicon compounds removed from the surface, i.e. contrary to the prior art it is essential that the sodium removal is not accompanied by a similar silicon solubilization and removal. Silicon is added as a bonding material and its removal weakens the carrier. We have discovered that removal of the silicates does not contribute to improvement in the catalytic performance.

Silica and silicates are important components of the carrier's composition. The carrier is made essentially of alumina, silica, and/or aluminum silicate particles that are shaped into pellets and fired at high temperature. Silica, or a silicate, is added to the binding material which holds these particles in the final pelletized shape. Therefore it is expected that the surface of the carrier will contain silicon compounds and it is a feature of the instant invention, that the carrier pretreatment should not substantially remove this binding material, i.e. removal and replacement of sodium should not be associated with comparable removal of silicon compounds.

The amount of silicon compounds in the carrier can vary broadly depending upon the manufacture.

We have discovered that there is no correlation between the rate of removal of surface sodium and that of the silicates, contrary to the teaching of the prior art. Actually, we have discovered that with prolonged washing at high temperature the ratio of Si/Na removed increases and does not have a fixed value, as was claimed in the prior art. We have discovered that this ratio can be reduced by lowering the temperature of the Li treatment, i.e. at a lower temperature of the Li treatment only a minimum amount of silicates is removed. This results in a lower ratio of the removed Si/Na in solution. Therefore, according to the present invention, it is essential to conduct the support pretreatment at a temperature lower than 100° C., preferably lower than 80° C. and it is most preferred that the support pretreatment temperature is lower than 70° C. In accordance with the present invention, it is advantageous that the carrier treatment is carried out such that the Si/Na weight ratio of removed material is less than about 5.0, and preferably is less than about 2.0. This is in sharp disagreement with procedures of the prior art where Si/Na ratios of removed material frequently are in excess of 10.

Utilizing pure water to remove surface sodium results in the removal of a considerable portion of the surface silicon. With pure water, the targeted Na removal value is achieved only when the water is at, or close to, its boiling point. At this temperature a large amount of silicates are also removed. On the other hand when pure water is used at a temperature considerably lower than 100° C., the sodium removal is rather limited and does not reach the assigned target, even after repeated washing for several hours. Accordingly carrier treatment with water alone is not effective in producing the improved carrier.

The concentration of the surface Na ions of the untreated carrier is the essential target for the treatment of the invention. This concentration is determined by the carrier manufacturer using the "Acid-Leachable test". In the standardized acid leachable test, the carrier sample is digested for a short period of time in 30% nitric acid solution. The sodium, potassium, calcium and silicon concentrations in the resulting solution are determined by atomic absorption spectrophotometry, Varian AA-110, in an air/acetylene flame using the wavelengths of 589.0 nm and 766.5 nm respectively. Alternatively, quantification is performed by aspirating the solutions into an inductively coupled plasma spectrophotometer, Spectro-analytical EOP ICP. The wavelengths used to simultaneously determine Al, Si, Na and K are 394.40 nm, 212.41 nm, 589.59 nm, and 766.46 nm respectively. Based on the surface Na concentration, the goal of the present invention is to remove at least 25%, preferably at least 50% and most preferably at least 90% of the sodium and replace the removed Na with up to 10 ppm Li, preferably 5 to 10 ppm Li.

The amount of sodium removed from the surface is measured through analysis of the solution used in the pretreatment.

The carrier pretreatment may be accomplished by any means which are effective. For purpose of illustration the following methods are viable means in achieving the pretreatment goal:

1. Heating the carrier in a solution which contains a lithium salt. The heating treatment continues until the targeted sodium concentration is detected in the treatment solution.
2. Stirring the carrier in a solution that contains a lithium salt, at room temperature or at an elevated temperature. The mixing continues until the targeted sodium concentration is detected in the treatment solution.
3. Pumping lithium solution over a bed that contains the carrier to be treated, at room temperature or at an elevated temperature.
4. Vacuum impregnate the carrier with the lithium solution and then wash the carrier with water.

In general, it is preferred to combine two or more of the abovementioned methods in one treatment.

The solvent suitable for the pre-treatment is a function of its ability to dissolve the lithium salts used and also to dissolve the removed sodium ions, without the concurrent excessive removal of the silicate anions. Common solvents as water, alcohol, or their mixtures are suitable for the pretreatment.

It is essential that the lithium's counter ion, the anion of the salt, not leave a residue on the carrier surface which would interfere with the catalytic function. Examples of the suitable lithium salts are lithium chloride, carbonate, nitrate, formate, and hydroxide. Solutions suitable for the pretreatment are 0.001N to 1.0N aqueous lithium salt solution. It is preferred to use 0.005 N to 0.5 N lithium solution and most preferred to use 0.01 N to 0.1 N lithium salt solution.

We have also discovered that for optimum catalytic performance Li should not replace more than a fraction of the removed Na. Therefore, it is preferred that Li should replace not more than 50% of the removed Na (on a molar bases). It is most preferred if the Li replacement is limited to not more than 25% of the removed Na. In general, the finished catalyst will contain less than 10 ppm Li.

After the pretreatment with lithium, the carrier is dried in order to remove the solvent from the carrier's pores, in preparation for the impregnation with the silver solution. It is however, essential to wash the treated carrier, before or after the drying step, with pure solvent before utilizing it in the preparation of the catalyst.

At the end of the pretreatment with the Li solution, the pores of the carrier will contain a solution that contains both lithium and sodium, as well as the other species that were removed from the carrier surface. Drying the carrier will lead to deposition of these materials-and will contaminate the surface. Therefore, washing the carrier with the pure solvent after the Li treatment will result in reducing the amount of surface contamination and will lead to improved performance. In place of pure solvent, a weak Li solution may be used in the final rinse.

The sodium removal treatment of the present invention is distinct from various pre-doping or pre-impregnation treatment such as described, for example, in EP 0 716 884. In the prior procedures, the lithium dopant is added to the carrier surface and deposited thereon in addition to the surface Na. In the present invention, replacement of sodium and removal thereof is essential.

Drying the carrier may be achieved in vacuum or under atmospheric pressure. The carrier is dried at a temperature lower than 400° C., and preferably at a temperature lower than 200° C. The carrier is most preferably heated to a temperature 0–50° C. higher than the boiling point of the solvent until all the solvent in the pores is evaporated.

The instant invention is preferred because it provides the following unique advantages:

1. Efficiency of sodium removal:

The rate of sodium removal in the present invention is more efficient than the water washing of the prior art.

2. Targeted level of sodium removal:

The present invention sets a target for sodium removal. This targeted level is proportional to the surface concentration, as indicated by the acid leachable test. In this regard different carriers will have different targets for sodium removal. Water, as used in the prior art, has a limited capacity for sodium removal and will not be able to remove the targeted amount in a practicable procedure.

3. Controlled Lithium deposition:

The prior art discloses carrier treatment with lithium without the concurrent sodium removal. This leads to an over abundance of both alkali metals on the surface of the carrier, which will interfere with the deposition of silver and will influence the catalyst's stability. The present invention avoids this serious disadvantage by removing sodium from the pores concurrently with the lithium deposition.

4. Removal of unbound alkali metals:

In the few cases of the prior art when the carrier was treated with Li as a pre-dopant, it was not washed after the treatment. Upon drying, the Li and sodium salts that were in solution inside the pores were deposited on the surface. This large amount of unbound salts will interfere with the catalytic function. The present invention offers a washing step after the lithium pre-treatment to remove the majority of the unbound ions. Unbound ions are those ions that are not bound to a specific site on the carrier's surface and if left in the pores will result in salts deposition on the surface.

5. Avoids removal of silicates:

The instant invention avoids the excessive removal of the silicon compounds concurrently with Na removal. Silicates are useful for the carrier's strength and their removal does not contributes to a better catalytic performance.

6. Lower drying temperature:

The prior art disclosed that the drying temperature of the carrier may be up to 1000° C., preferably up to 600° C. This high drying temperature would lead to the migration of sodium ions from the subsurface to the surface, leading to poor catalytic performance. The current invention discloses the preference of a much lower drying temperature to avoid the migration of sodium.

7. Proof of catalyst stability

The instant invention presents comparative examples that substantiate the claimed improved performance, especially the stability of the pretreated carrier.

The catalysts of the instant invention are characterized by having higher performance stability and higher selectivity to produce ethylene oxide. As will be illustrated in the examples, the stability of these catalysts is superior to catalysts that have the lithium components added in the silver impregnation step, catalysts made with untreated carriers, carriers that were treated only with water, or carriers that were pretreated with lithium without the concurrent removal of sodium.

Preferred supports are those containing principally alpha-alumina, particularly those containing up to about 15 wt % silica. Especially preferred supports have a porosity of about 0.1–1.0 cc/g and preferably about 0.2–0.7 cc/g. Preferred supports also have a relatively low surface area, i.e. about 0.2–2.0 m$^2$/g, preferably 0.4–1.6 m$^2$/g and most preferably 0.5–1.3 m$^2$/g as determined by the BET method. See J. Am. Chem. Soc. 60, 3098–16 (1938). Porosities are determined by the mercury porosimeter method; see Drake and Ritter, Ind. Eng. Chem. anal. Ed., 17, 787 (1945). Pore and pore diameter distributions are determined from the surface area and apparent porosity measurements.

For use in commercial ethylene oxide production applications, the supports are desirably formed into regularly shaped pellets, spheres, rings, etc. Desirably, the support particles may have an equivalent diameters in the range from 3–12 mm and preferably in the range of 4–10 mm, which are usually compatible with the internal diameter of the tubes in which the catalyst is placed. An Equivalent diameter is the diameter of a sphere having the same external surface (i.e. neglecting surface within the pores of the particle) to volume ratio as the support particles being employed.

Preferred catalysts are prepared in accordance with this invention contain up to about 30% by weight of silver, expressed as metal, deposited upon the surface and throughout the pores of a porous refractory support. Silver contents higher than 20% by weight of total catalyst are effective, but result in catalysts which are unnecessarily expensive. Silver contents, expressed as metal, of about 5–20% based on weight of total catalyst are preferred, while silver contents of 8–15% are especially preferred.

In addition to silver, the catalyst of the invention also contains promoters, especially a critical amount of alkali metal promoter component. The amount of the alkali metal promoter is not more than 3000 ppm expressed as alkali metal based on the catalyst weight; preferably the catalyst contains 400–1500 ppm, more preferably 500–1200 ppm alkali metal based on the catalyst weight. Preferably the alkali metal is cesium although lithium, potassium, rubidium and mixtures thereof can also be used.

Optionally also of practice of the invention is the provision of sulfur as a promoting catalyst component. The sulfur component can be added to the catalyst support impregnating solution as sulfate, eg. cesium sulfate, ammonium sulfate, and the like. U.S. Pat. No. 4,766,105 describes the use of sulfur promoting agents, for example at column 10, lines 53–60, and this disclosure is incorporated herein by reference. When used, the amount of sulfur (expressed as the element) in the amount of 5–300 ppm by weight, based on the weight of catalyst, is preferred.

The catalyst may also contain a fluorine promoter in the amount expressed as the element of 10–300 ppm by weight based on the weight of the catalyst. Ammonium fluoride, alkali metal fluoride, and the like can be used.

Preferably, the silver is added to the support by immersion of the support into a silver/amine impregnating solution or by the incipient wetness technique. The silver containing liquid penetrates by absorption, capillary action and/or vacuum into the pores of the support. A single impregnation or a series of impregnations, with or without intermediate drying, may be used, depending in part upon the concentration of the silver salt in the solution. To obtain catalyst having silver contents within the preferred range, suitable impregnating solutions will generally contain from 5–50 wt % silver, expressed as metal. The exact concentration employed will depend upon, among other factors, the desired silver content, the nature of the support, the viscosity of the liquid, and the solubility of the silver compound.

Impregnation of the pretreated carrier is achieved in a conventional manner. The carrier is placed in the silver solution until all of the solution is absorbed by the support. Most preferably, the dry pretreated carrier is placed under vacuum and then the silver solution is introduced. The vacuum is removed only when all the carrier's pellets are coated with the solution, or when the liquid level is sufficient to cover the amount of carrier used. This ensures that all the pores of the carrier have been filled with the impregnating solution.

The impregnating solution, as already indicated, is characterized as a silver/amine solution, preferably such as is fully described in U.S. Pat. No. 3,702,259 the disclosure of which is incorporated herein by reference.

After impregnation, any excess impregnating solution is separated and the support, impregnated with silver and promoters, is calcined or activated. In the most preferred practice of the invention, calcination is carried out as described in commonly assigned U.S. Pat. No. 5,504,052 granted Apr. 2, 1996 and co-pending application Ser. No. 08/587,281 filed Jan. 16, 1996, the disclosures of which are incorporated herein by reference. The calcination is accomplished by heating the impregnated support, preferably at a gradual rate, to a temperature in the range of 200–500° C. for a time sufficient to convert the contained silver salt to silver metal and to decompose the organic materials and remove the same as volatiles.

The impregnated support is optionally maintained under an inert atmosphere while it is above 300° C. during the entire procedure. While not wishing to be bound by theory, it is believed that at temperatures of 300° C. and higher, oxygen is absorbed in substantial quantities into the bulk of the silver where it has an adverse effect on the catalyst characteristics. Inert atmospheres which are optionally employed in the invention are those which are essentially free of oxygen.

An alternative method of calcination is to heat the catalyst in a stream of air at a temperature not exceeding 300° C., preferably not exceeding 270° C.

Catalysts prepared in accordance with the invention have improved performance, especially stability, for the production of ethylene oxide by the vapor phase oxidation of ethylene with molecular oxygen. These usually involve reaction temperatures of about 150° C. to 400° C., usually about 200° C. to 300° C., and reaction pressures in the range from 0.5 to 35 bar. Reactant feed mixtures contain 0.5 to 20% ethylene and 3 to 15% oxygen, with the balance comprising comparatively inert materials including such substances as nitrogen, carbon dioxide, methane, ethane, argon and the like. Only a portion of the ethylene usually is reacted per pass over the catalyst and after separation of the desired ethylene oxide product and the removal of appropriate purge streams and carbon dioxide to prevent the uncontrolled build up of inerts and/or by-products, unreacted materials are returned to the oxidation reactor.

The following examples illustrate the invention.

EXAMPLE 1 a. Preparation of a Stock Solution of Silver/Amine Complex

A silver solution was prepared using the following components (parts are by weight):

Silver oxide—834 parts

Oxalic acid—442 parts

De-ionized water—2808 parts

Ethylenediamine—415 parts

Silver oxide was mixed with water, at room temperature, followed by the gradual addition of the oxalic acid. The mixture was stirred for 15 minutes and at that point, the color of the black suspension of silver oxide had changed to the gray/brown color of silver oxalate. The mixture was filtered and the solids were washed with 3 liters of de-ionized water.

The sample was placed in an ice bath and stirred while ethylenediamine and water (as a 66%/34% mixture) were added slowly in order to maintain the reaction temperature lower than 33° C. After the addition of all the ethylenediamine/water mixture, the solution was filtered at room temperature. The clear filtrate was utilized as a silver/amine stock solution for the catalyst preparation.

b. Promoters Addition

The clear stock solution was diluted with the 66/34 mixture of ethylenediamine/water. In addition, Cs hydroxide and ammonium hydrogen sulfate were added to the diluted silver solution in order to prepare a catalyst containing 11% silver, 40 ppm sulfur, and 800 ppm cesium.

c. Catalyst Impregnation

A 150 g sample of the carrier was placed in a pressure vessel and then exposed to vacuum until the pressure was reduced to 50 mm Hg. 200 ml of the adjusted silver/promoters solution was introduced to the flask while it is still under vacuum. The pressure of the vessel was allowed to rise to atmospheric pressure and its contents were shaken for few minutes. The catalyst was separated from the solution and was now ready for calcination.

d. Catalyst Calcination

Calcination, deposition of silver, was induced by heating the catalyst up to the decomposition temperature of the silver salt. This was achieved via heating in a furnace that has several heating zones in a controlled atmosphere. The catalyst was loaded on a moving belt that entered the furnace at ambient temperature. The temperature was gradually increased as the catalyst passed from one zone to the next. It was increased, up to 400° C., as the catalyst passed through seven heating zones. After the heating zones, the belt passed through a cooling zone that gradually cooled the catalyst to a temperature lower than 100° C. The total residence time in the furnace was 22 minutes.

c. Catalyst Testing

The catalyst was tested in a stainless steel tube that was heated by a molten salt bath. A gas mixture containing 15% ethylene, 7% oxygen, and 78% inert, mainly nitrogen and carbon dioxide, was passed through the catalyst at 300 p.s.i.g. The temperature of the reaction was initially adjusted in order to obtain ethylene oxide productivity of 160 Kg per hour per $m^3$ of catalyst. After about one week of testing at this low work rate, the temperature of the reaction was raised to increase ethylene oxide productivity to 330 Kg per hour per $m^3$ of catalyst.

The carriers used were low sodium carriers made essentially of alpha-alumina and having the following specifications:

TABLE 1

| Carrier | Water absorption Ml/gm | Surface analysis (ppm): (Acid-Leachable test) | |
|---|---|---|---|
| | | Sodium | Potassium |
| A | 31.1 | 81 | 41 |
| B | 31.6 | 57 | 49 |
| C | 30.4 | 89 | 5 |
| D | 33.4 | 46 | 12 |
| F | 33.6 | 78 | 14 |

EXAMPLE 2

This example demonstrates that there is no correlation between the rate of dissolution of surface sodium and that of the silicates:

Step 1. A 300 g sample of carrier A was placed in a pressure vessel and then exposed to vacuum until the pressure was reduced to 50 mm Hg. 1500 ml of 0.02N lithium carbonate solution in water was introduced to the flask while it is still under vacuum. When all the solution was added, the pressure of the vessel was allowed to rise to atmospheric pressure and its contents were boiled under total reflux condition. The pretreatment time of this step was 15 minute.

Step 2. The solution was removed and 1500 ml of boiling 0.02 N lithium carbonate solution in water was added to the flask and the boiling of the mixture was resumed for additional 15 minutes. This step was repeated additional two more cycles.

Step 3. After removing the lithium solution from the last cycle, 1500 ml of deionized water was added to the carrier and boiling of the mixture was resumed. This water washing was repeated once.

The six liquid samples were weighed and analyzed for their contents of soluble salts to evaluate the amount of removed Na and Si (Table-2):

TABLE 2

| Cycle # | Salts removed from the carrier (ppm) | | Ratio of removed |
|---|---|---|---|
| | Si | Na | Si/Na |
| 1 | 373.3 | 110.0 | 3.4 |
| 2 | 378.2 | 57.6 | 6.6 |
| 3 | 383.7 | 44.2 | 8.7 |
| 4 | 194.5 | 15.0 | 12.9 |
| 5 | 57.8 | 4.5 | 12.9 |
| 6 | 42.0 | 2.5 | 16.5 |

As demonstrated by the above results, there is no correlation between Na and Si removal from the carrier.

EXAMPLE 3

The same procedure of example 2 was repeated with the exception that only deionized water was used in the treatment. The refluxing periods were increased to compensate for the limited capacity of pure water in removing the targeted amount of Na. Analysis of the collected solutions revealed the following (Table-3):

TABLE 3

| Cycle # | Salts removed from the carrier (ppm) | | Ratio of removed |
|---|---|---|---|
| | Si | Na | Si/Na |
| 1 | 21.6 | 10.8 | 2 |
| 2 | 21.7 | 5.79 | 3.76 |
| 3 | 19.03 | 3.9 | 4.91 |
| 4 | 40.5 | 5.05 | 8.02 |
| 5 | 23.95 | 2.15 | 11.14 |
| 6 | 28.1 | 2.14 | 13.16 |
| 7 | 19.34 | 1.28 | 15.16 |

This example too proves that there is no correlation between the removed Na and silicates. It also demonstrates that water is not able to remove the desired level of sodium without the concurrent removal of a large amount of the silicates.

EXAMPLE 4

This example is designed to illustrate that for a targeted Na removal, the amount of removed silicates can be controlled by controlling the temperature of the treatment.

Step 1. A 300 g sample of carrier A having 81 ppm surface Na was placed in a pressure vessel and then exposed to vacuum until the pressure was reduced to 50 mm Hg. 1500 ml of lithium chloride solution (0.02 N LiCl in water) was introduced to the flask while it is still under vacuum. When all the solution was added, the pressure of the vessel was allowed to rise to atmospheric pressure and its contents were mixed at room temperature for 15 minute. The solution was weighed and analyzed.

Step 2. The solution was removed and 1500 ml of fresh LiCl solution in water was added to the flask and mixing was resumed for additional minutes, at room temperature. The solution was weighed and analyzed. The amounts of Na and Si extracted in the last two steps were summed and used to calculate the total amounts removed from the carrier. Step 2 was repeated for as many times as needed to achieve the targeted Na removal, 80 ppm Na.

Step 3: After the last Li treatment, the carrier was washed with deionized water at room temperature.

Step 4, 5, 6: The same procedure of step 1–3 were repeated at 45, 65, 85, and 100° C. These treatments were followed by washing the carriers with deionized water at room temperature. The results are summarized in table-4

TABLE 4

| Example | Solution used for Na removal | Treatment Temp ° C. | Total time (hr.)* | Na (ppm) removed | Si (ppm) removed | Si/Na ratio |
|---|---|---|---|---|---|---|
| 4a | Water | 100 | 16 | 61.89 | 225.3 | 3.64 |
| 4b | 0.02N LiCl | 25 | 3.5 | 61.8 | 1.8 | 0.03 |
| 4c | 0.02N LiCl | 45 | 1.75 | 80.85 | 9.2 | 0.11 |
| 4d | 0.02N LiCl | 65 | 0.75 | 80.76 | 17.73 | 0.22 |
| 4e | 0.02N LiCl | 85 | 0.75 | 82.43 | 32.96 | 0.4 |
| 4f | 0.02N LiCl | 100 | 0.25 | 82.50 | 45.48 | 0.55 |

*Total time (hr.) needed to remove the targeted amount of Na (80 ppm) As shown by the results in Table 4, the use of water alone was relatively ineffective for Na removal even at excessive contact times and resulted in excessive Si removal

EXAMPLE 5

This example is designed to demonstrate that the extensive removal of silicates affects the carrier's strength. The instant invention is designed to remove the minimum amount of silicates and preserve the carrier's physical characteristics:

Step 1: 300 grams of carrier-A were treated in a process similar to that in example-2. At low temperature, water has a very low capacity to dissolve surface ions. Therefore, boiling deionized water was used in this example. The water was removed every fifteen minutes and was replaced with a fresh batch of deionized water. Even at 100° C., water has a limited capacity for removing the targeted sodium level. After twenty cycles the amounts of sodium and silica removed were 74 and 454 ppm, respectively.

Step 2: 300 grams of carrier-A were treated in a process similar to that in step-1. Lithium chloride solution (0.02N) was used instead of the deionized water. In this step the procedure was conducted at 45° C., at this low temperature the lithium solution was rather efficient in removing sodium. After seven cycles, the amounts of sodium and silicon removed were 81 and 9 ppm, respectively.

Step 3: The treated carriers in steps 1 and 2 of this example were tested for their crush strength (hardness). The instrument used for the test was CHATILLON (model UTSM). The following table illustrates that washing with deionized water has weakened the carrier, because of the excessive removal of surface silicates. By contrast the Li treatment has not affected the strength of the carrier (table 5):

TABLE 5

| Carrier | Na (ppm) removed | Si (ppm) removed | Crush strength Lb |
|---|---|---|---|
| Untreated sample | 0 | 0 | 22 |
| Washed with water | 74 | 454 | 18.9 |
| Carrier treated with LiCl | 81 | 9 | 21.4 |

Step 4: The treated carriers, in steps 1 and 2 of this example, were tested for their attrition. The method used for the attrition test follows ASTM D-4058-81: "Standard test method for ATTRITION AND ABRASION OF CATALYSTS AND CATALYST CARRIERS"

The results of the test demonstrate that after the standard 30 minutes test the loss on attrition is higher after washing with deionized water. This is an indication that the water washing had weakened the carrier, because of the excessive removal of surface silicates. By contrast the Li treatment has not affected the strength of the carrier, table-6:

TABLE 6

| Carrier | Na (ppm) removed | Si (ppm) removed | Loss on attrition % |
|---|---|---|---|
| Untreated sample | 0 | 0 | 8.6 |
| Washed with water | 74 | 454 | 10.2 |
| Carrier treated with LiCl | 81 | 9 | 8.4 |

EXAMPLE 6

The goal of this example is to demonstrate the efficiency of the Li treatment procedure in removing the surface Na, without the excessive removal of silicates. This efficiency made it possible to conduct the treatment at room temperature, which also helped in reducing the ratio Si/Na:

Step 1. A 300 g sample of carrier A was placed in a pressure vessel and then exposed to vacuum until the pressure was reduced to 50 mm Hg. 1500 ml of the solution was introduced to the flask while it is still under vacuum. When all the solution was added, the pressure of the vessel was allowed to rise to atmospheric pressure and its contents were mixed at room temperature for 15 minute. The solution was weighed and analyzed.

Step 2. The solution was removed and 1500 ml of fresh Li solution in water was added to the flask and mixing was resumed for additional 15 minutes at room temperature. The solution was weighed and analyzed. The amounts of Na and Si extracted in the last two steps were summed and used to calculate the total amounts removed from the carrier.

Step 2 was repeated for as many times as needed to achieve the targeted Na removal.

Step 3. After removing the solution from the last cycle, 1500 ml of deionized water was added to the carrier and mixed for additional 15 minutes at room temperature, to assure that the solution in the pores is free from the extracted salts. This water solution was also analyzed for its salt contents.

The experiment was repeated using different lithium salts as indicated in table-7:

It is evident that the ratio of the removed Si/Na is considerably lower at the low temperature and Si removal minimized.

EXAMPLE 7

300 g sample of carrier A was vacuum impregnated using 1500 ml of 0.01N lithium carbonate solution in water, as in example 2. The carrier and the liquid were then transferred to a jacketed addition funnel and the lithium solution was allowed to circulate through the carrier's bed. The solution flowed constantly to the top of the funnel at a rate of about 15 L per hour. It was also drained, at the same rate, from the bottom of the funnel and the level of solution inside the funnel was maintained at about one inch above the level of the carrier. A hot liquid was allowed to circulate through the jacket to keep its temperature at 85–90° C. After one hour, the solution was drained and collected for analysis.

The same carrier sample was then treated with hot de-ionized water to wash any solution that was left inside the carrier's pores at the end of the Li treatment. The hot water, 90° C., was allowed to circulate through the funnel in a similar procedure to that of the Li treatment step. At the end of an additional hour the water was drained and collected for analysis. The treated carrier was dried by placing it in an oven at 150° C. for 10 hours.

Analysis of the Li solution showed that the first drained Li solution has removed 65 ppm sodium from the carrier's surface. Analyzing the second solution showed that it contained both Li and Na and that the total amount of the sodium removed in the pretreatment has reached 75 ppm.

EXAMPLE 8

Comparative 300 g sample of carrier A was treated with de-ionized water, in an identical treatment to that in example-7. The total amount of sodium removed was 19.5 ppm.

EXAMPLE 9

A 300 g sample of carrier B was treated at 65° C. with 0.02N lithium hydroxide solution in water. The procedure was identical to the one reported in example 4d. The treated carrier was then washed twice with 1500 ml deionized water at room temperature. Each of the water washing cycles lasted for 30 minutes and at the end the carrier was dried at 150° C.

EXAMPLE 10

A 300 g sample of carrier C was treated at 65° C. with 0.02N lithium hydroxide solution in water. The procedure was identical to the one reported in example 4d. The treated carrier was then washed twice with 1500 ml deionized water at room temperature. Each of the water washing cycles lasted for 30 minutes and at the end the carrier was dried at 150° C.

TABLE 7

| Example | Solution used for Na removal | Treatment Temp ° C. | Total time (hr.)* | Na (ppm) removed | Si (ppm) removed | Si/Na ratio |
|---|---|---|---|---|---|---|
| 6a (comparative) | Water | 100 | 16 | 61.89 | 225.3 | 3.64 |
| 6b | 0.02N Li$_2$CO$_3$ | 25 | 3.5 | 58.6 | 2 | 0.03 |
| 6c | 0.02N LiCl | 25 | 3.5 | 61.8 | 1.8 | 0.03 |
| 6d | 0.02N LiNO$_3$ | 25 | 3.5 | 55.2 | 1.7 | 0.03 |

EXAMPLE 11

A 300 g sample of carrier D was treated at 65° C. with 0.02N lithium nitrate solution in water. The procedure was identical to the one reported in example 4d. The treated carrier was then washed twice with 1500 ml deionized water at room temperature. Each of the water washing cycles lasted for 30 minutes and at the end the carrier was dried at 150° C.

The solutions that were collected in examples 9–11 were analyzed for Na and Si to evaluate the amounts of removed salts. The results are summarized in table-8:

TABLE 8

| | | Salts removed from the carrier (ppm) | | Ratio of removed |
|---|---|---|---|---|
| Example | Carrier | Si | Na | Si/Na |
| 9 | B | 425 | 90.5 | 4.5 |
| 10 | C | 661 | 95 | 6.9 |
| 11 | D | 78 | 134 | 0.6 |

EXAMPLE 12

Example 12-a: Example 6 was repeated using carrier A and a 0.1N solution of LiCl in water and the treatment was done at room temperature. The amount of removed Na was 91 ppm.

Example 12-b: Example 6 was repeated using carrier A and 0.02N LiNO3 solution in water at 45° C. The amount of Na removed was 79 ppm.

The surface of the treated carriers, 12-a and 12-b, was analyzed using XPS. The surface of the untreated carrier, carrier A, was also analyzed for comparison.

Analytical Conditions

| | |
|---|---|
| Instrument | Physical Electronics Quantum 2000 Scanning XPS |
| X-ray source | Monochromatic Al K? |
| Analysis areas | 1.4 mm x 0.2 mm |
| Take-off angle | 45 degrees |
| Charge Neutralization | Low energy electron and ion floods |

Results

TABLE 9

| | | Atomic Concentrations (atomic %). | | |
|---|---|---|---|---|
| | | Na | Surface concentration (XPS) | |
| Carrier | Treatment | removed | Na | Si |
| Carrier A | Not treated | 0 | 1.7 | 3.4 |
| Carrier 12-a | 0.1N LiCl at 25° C. | 91 | 1.0 | 3.25 |
| Carrier 12-b | 0.02N LiNO3 at 45° C. | 79 | 0.8 | 3.4 |

This example illustrates that based on XPS analysis the Li pretreatment was efficient to remove the targeted amount of Na without altering the surface concentration of Si.

EXAMPLE 13–15

Selected samples of the treated carriers were used to prepare supported silver catalyst for the epoxidation of ethylene. Therefore, 150 g samples of the following carriers were used in the preparation, following the exact details of the procedure in example 1. After calcination, the catalysts were tested at a high work rate (330 Kg EO/m$^3$/hr.) to determine their relative stabilities (table-10):

TABLE 10

| Example # | Carrier | Sel. at 100 hr. | Sel. at 200 hr | Sel. at 300 hr | Sel. at 400 hr | Sel. at 500 hr | Sel. at 600 hr |
|---|---|---|---|---|---|---|---|
| 13 Comparative | A (untreated) | 80.8 | 80.7 | 80.1 | 79.5 | 79.4 | |
| 14 | 4c | 80.1 | 80.1 | 80.2 | 80.2 | 80.0 | 80.1 |
| 15 | 4f | 80.2 | 80.2 | 80.2 | 80.0 | 80.0 | 80.0 |

It is evident that catalysts using the untreated carrier are less stable than those prepared with carriers treated according to this invention.

EXAMPLE 16

Example 2 was repeated with the exception that it involved only two Li treatment cycles and was not washed with water at the end of the treatment.

Analysis of the dry treated carrier (carrier 16) showed that the solutions have removed 129 ppm sodium and that the dry carrier contained 57 ppm Li.

150 g samples of the carrier 16 was used in Ag catalyst preparation that followed the exact details of the procedure in example 1. After calcination the catalyst was tested at a high work rate (330 Kg EO/m$^3$/hr.) to determine its their relative stability. The table-11 summarizes the result of the test and compares it with the results of example 15. In the latter case the carrier was washed with water after the Li treatment.

TABLE 11

| Example # | Carrier | Li ppm in the catalyst | Sel. at 100 hr. | Sel. at 200 hr | Sel. at 300 hr | Sel. at 400 hr | Sel. at 500 hr | Sel. at 600 hr |
|---|---|---|---|---|---|---|---|---|
| 16 | 16 | 29 | | 80.8 | 80.5 | 79.5 | 78.5 | |
| 15 | 4f | 3.5 | 80.2 | 80.2 | 80.2 | 80.0 | 80.0 | 80.0 |

This example demonstrates that higher catalyst performance stability requires only a limited amount of Li. Higher Li concentration gave a lower stability catalyst. Therefore, after the carrier pre-treatment, it is essential to remove the Li in the pores and leave only a limited amount of Li on the carrier's surface, i.e. up to 10 ppm Li.

EXAMPLE 17

300 g sample of carrier A was vacuum impregnated using 1500 ml of 0.02N lithium carbonate solution in water, as in example 2. The carrier and the liquid were then transferred to a jacketed addition funnel and the lithium solution was allowed to circulate through the carrier's bed. The solution flowed constantly to the top of the funnel at a rate of about 15 L per hour. It was also drained, at the same rate, from the bottom of the funnel and the level of solution inside the funnel was maintained at about one inch above the level of the carrier. A 25° C. liquid was allowed to circulate through the jacket to keep its temperature at a constant room temperature. After two hours, the solution was drained and collected for analysis.

The same carrier sample was then treated twice with de-ionized water to wash any solution that was left inside the carrier's pores at the end of the Li treatment. The room temperature water was allowed to circulate through the funnel in a similar procedure to that of the Li treatment step. The treated carrier was dried by placing it in an oven at 150° C. for 10 hours. The dried carrier was analyzed for its Li content.

Analysis of the Li solution showed that the first drained Li solution has removed 40 ppm sodium and 12 ppm silicon from the carrier's surface. Analyzing the dried carrier showed that it contained 5.2 ppm Li.

We claim:

1. In a process for the preparation of a catalyst for the production of ethylene oxide comprised of silver supported on an alumina carrier initially containing both sodium and silicate ions on the surface thereof, the improvement which comprises in a carrier pretreatment with an aqueous lithium salt solution at a temperature lower than 100° C. removing at least 25% of the sodium ions on the surface of the carrier and partially replacing the removed sodium ions with up to 10 ppm lithium ions, drying the carrier and thereafter depositing silver and promoters on the surface of the pre-treated and dried carrier.

2. The process of claim 1 wherein the carrier is treated with an aqueous lithium salt solution at a temperature lower than 80° C.

3. The process of claim 1 wherein the carrier is treated with an aqueous lithium salt solution at a temperature of lower than 70° C.

4. An ethylene oxide catalyst prepared by the process of claim 1.

5. The process of claim 1 wherein the treated carrier is washed with water prior to its use in catalyst preparation.

6. The process of claim 1 wherein during the sodium ion removal the removal of Si is maintained below the level which adversely affects the support structural characteristics.

7. The process of claim 6 wherein the weight ratio of removed Si/Na is 5.0 or less.

* * * * *